US011140251B2

(12) United States Patent
Diamond

(10) Patent No.: US 11,140,251 B2
(45) Date of Patent: *Oct. 5, 2021

(54) DIVIDED DISPLAY OF MULTIPLE CAMERAS

(71) Applicant: Adam Diamond, New York, NY (US)

(72) Inventor: Adam Diamond, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/098,547

(22) Filed: Nov. 16, 2020

(65) Prior Publication Data

US 2021/0112150 A1    Apr. 15, 2021

Related U.S. Application Data

(63) Continuation of application No. 16/683,953, filed on Nov. 14, 2019, now Pat. No. 10,848,606, which is a continuation-in-part of application No. 16/600,494, filed on Oct. 12, 2019, now abandoned.

(51) Int. Cl.
*H04M 1/00* (2006.01)
*H04M 1/02* (2006.01)
*H04B 1/3827* (2015.01)

(52) U.S. Cl.
CPC ........ *H04M 1/0264* (2013.01); *H04B 1/3833* (2013.01)

(58) Field of Classification Search
CPC ............. H04M 1/0264; H04M 1/0266; H04M 2250/52; H04M 2250/20; H04B 1/3888
See application file for complete search history.

(56) References Cited

U.S. PATENT DOCUMENTS

| | | | |
|---|---|---|---|
| 10,645,294 B1* | 5/2020 | Manzari | H04N 5/232945 |
| 10,848,606 B2* | 11/2020 | Diamond | H04M 1/72454 |
| 2019/0320140 A1* | 10/2019 | Lyu | H04N 7/141 |
| 2020/0260049 A1* | 8/2020 | Erna | H04N 7/0806 |

* cited by examiner

*Primary Examiner* — Nhan T Le
(74) *Attorney, Agent, or Firm* — Michael J. Feigin, Esq.; Feigin and Fridman LLC

(57) ABSTRACT

A handheld wireless transceiver (e.g. a "smart phone") is claimed which has cameras in one, two, or three sides such as a left, front, and/or right side. The transceiver has a display divided vertically along a top portion thereof into three sections. Each section displays a version of output from a respectively positioned camera (left, middle, right). Depending on a detected distance of an object to each camera, an alert/alarm is indicated on the corresponding part of the screen to warn a user of the device of a collision with a nearby object, such as while walking. This display is required to be shown, in some embodiments, when one is "texting".

12 Claims, 6 Drawing Sheets

DIVIDED DISPLAY OF MULTIPLE CAMERAS

FIELD OF THE DISCLOSED TECHNOLOGY

The disclosed technology relates to handheld devices with displays, and more specifically to a handheld transceiver with multiple cameras whose output therefrom shown on a display.

BACKGROUND OF THE DISCLOSED TECHNOLOGY

Hoods on electronic devices surround sides of the device and extend upwards therefrom to provide a barrier to viewing a display on a top side of the device from the sides where the hood is present. Thus, a bottom side may be left unimpeded by a hood to allow a person who is adjacent to (closest to) a bottom side to view the display at an acute angle thereto (looking down from between a position between above and behind the device).

There is a problem with phones today, with or without a hood, wherein a person on the phone becomes unaware of their surroundings. In such a case, they are more likely to get into car accidents, walk into objects including other people, and otherwise cause harm. What is needed is a way to alert a person when they are about to have a collision with another object in order to prevent accidents.

SUMMARY OF THE DISCLOSED TECHNOLOGY

A handheld wireless transceiver with multiple (two or more) cameras (a device which converts light into electrical signals for exhibiting on a display) has a display (a device which outputs visible light with human readable and distinguishable text and/or graphics). The handheld device generally has a back, front, left, right, bottom, and top side, each substantially at 90 degree angles to one another and which substantially form a rectangular prism in some embodiments of the disclosed technology.

A display is on a front side thereof with the cameras in one or more of the left, front, and right sides. As the body of the wireless transceiver has a left, front, and right side in embodiments of the disclosed technology, a camera can be in any, two of, or all of these sides (such as one camera in each side). Each camera, thus, is at a 90 or 180 degree offset from each other camera in embodiments of the disclosed technology. The cameras can be closer to the front side than rear side (on the front side or on a left/right side portion which is closer to the front than the back) in order to ensure that when the device is held, the cameras are unobstructed.

Each of a portion of a left, center, and right of the display exhibit a (respective) version of output from corresponding (respective) left, center/front, and right facing cameras in embodiments of the disclosed technology. The version of the output can be direct output or can be modified, such as in color tint or brightness, based on detection of a distance of an object to a respective one of the cameras (e.g. distance of an object to a left camera modifies the color or brightness of the left camera output and so forth). Infrared cameras can be used to determine distance as can size of an object in a viewing field of a camera. A "version" is output which is exactly based on input or output which is a modified version of, but has some recognizable characteristics of, the input. For example, when the input is a video signal the output can include a recognizable but different variant of the input, such as by varying color, brightness, or the like as indicated in this disclosure.

Text messaging can cause operation of the cameras, and in fact, in some embodiments, the text messaging only functions when the version of output from the cameras is exhibited on the display. Text messaging or texting is defined as the preparation for, sending, or receiving messages which include sending or receiving of written text (however inputted) between the handheld wireless transceiver and another device such as using the short message service (SMS) known in the art of cellular connectivity. Reading or typing of a text message causes, in some embodiments of the disclosed technology, a version of the output from corresponding respective left, forward, and right facing cameras to be said exhibited on the display.

Each camera receives power (electrical current) from, and/or is electrically charged by, a direct electrical connection (e.g. copper wire carrying electrical current) with/to the handheld transceiver in some embodiments of the disclosed technology. Output of each camera is wirelessly communicated to the handheld transceiver in some embodiments and transmitted via direct electrical connection in other embodiments.

The display can be divided into ⅓ portions with a left, center, and right third. A portion of each of these thirds can be dedicated to exhibiting a version of output from a respective left, front, and right camera. The output is modified in color, tint, or brightness based on how close or far away a nearest detected object is in embodiments of the disclosed technology.

Any device or step to a method described in this disclosure can comprise or consist of that which it is a part of, or the parts which make up the device or step. The term "and/or" is inclusive of the items which it joins linguistically and each item by itself. "Substantially" is defined as "at least 95% of the term being described" and any device or aspect of a device or method described herein can be read as "comprising" or "consisting" thereof.

DETAILED DESCRIPTION OF EMBODIMENTS OF THE DISCLOSED TECHNOLOGY

A handheld wireless transceiver (e.g. a "smart phone") is claimed which has cameras in each of three sides. That is, the cameras are in the left, front, and right sides, or some combination thereof, of the handheld wireless transceiver. These sides are each perpendicular to a primary display of the device on a top side. The transceiver has a display divided vertically along a portion thereof into three sections. Each section displays a version of output from a respectively positioned camera (left, middle/front, right). Depending on a detected distance of an object to each camera, an alert/alarm is indicated on the corresponding part of the screen to warn a user of the device of a collision with a nearby object, such as while walking. This display is required to be shown, in some embodiments, when one is "texting".

Figure 1:
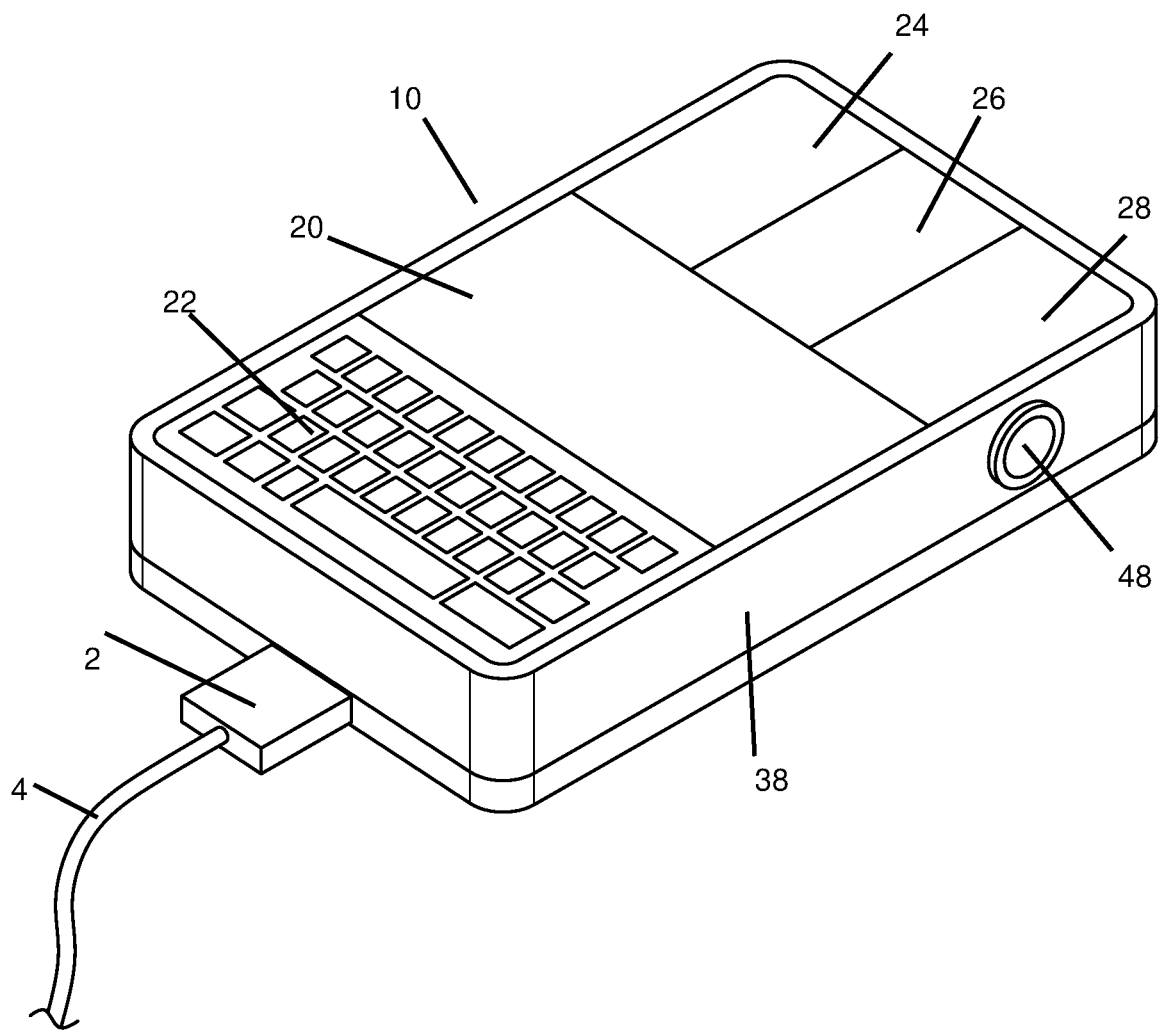
FIG. 1 shows a perspective view of a handheld wireless transceiver with a side facing camera shown, in an embodiment of the disclosed technology.
Figure 2:
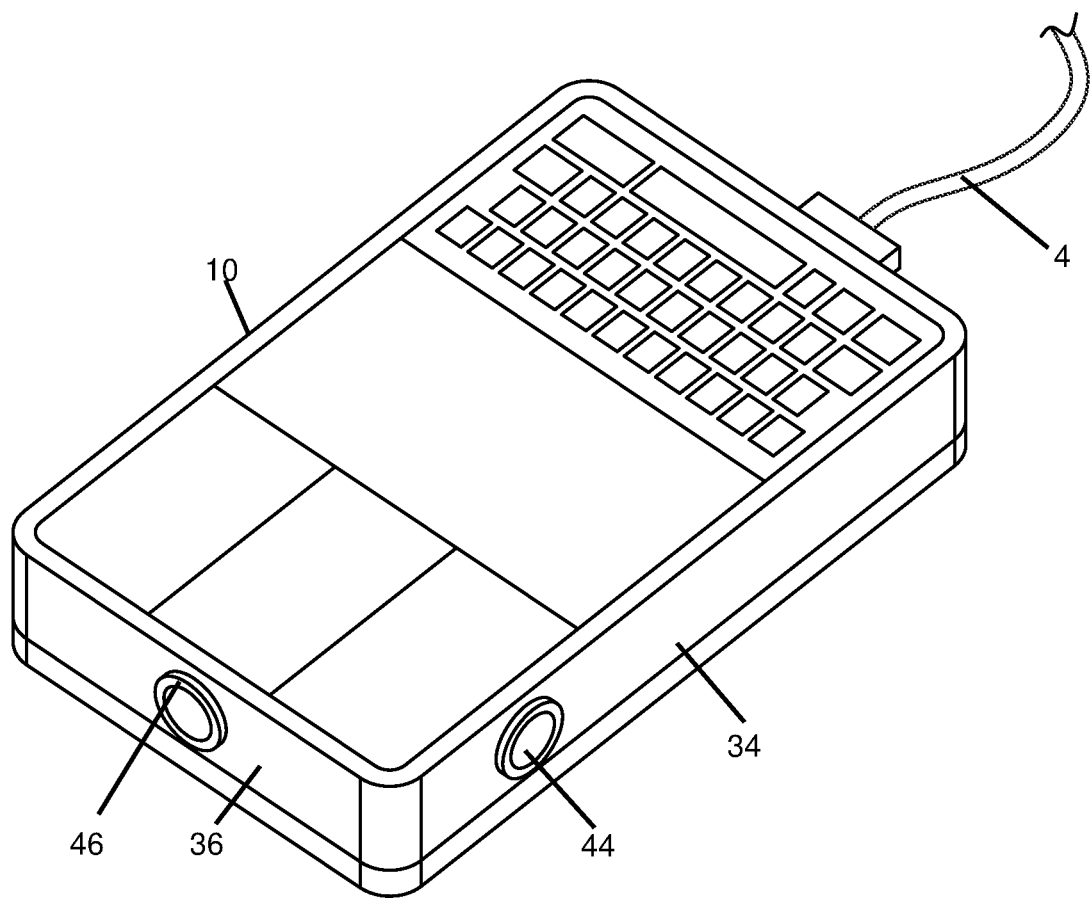
FIG. 2 shows a reverse side perspective view thereof FIG. 1 with a front and alternate side facing camera shown.

FIG. 1 shows a perspective view of a handheld wireless transceiver with a side facing camera shown, in an embodiment of the disclosed technology. FIG. 2 shows a reverse side perspective view thereof FIG. 1 with a front and alternate side facing camera shown. Here, the handheld wireless transceiver or "smart phone" has a body 10 which has there-within at least one transmitter and at least one receiver or transceiver, such as for sending and receiving data via known protocols including cellular, "WiFi" (802.11), and/or Bluetooth. The device also has a input/output port to which an electrical cable 4 having a matching port 2 which plugs into and creates an electrical connection by which the device can be attached to another device electrically. By way of the cable 4 or an internal cable in the smart phone, the smart phone 10 can provide electrical current to the cameras which can be built into the body of the smart phone or attached to an outside thereof. In some embodiments, by way of the cable 4, data is sent and received between the device 10 and the cameras 44, 46, and/or 48. In other embodiments, the sending and receiving of data between the phone 10 and cameras 44, 46, and/or 48 is performed wirelessly (such as with Bluetooth). The phone 10 (which refers to the "handheld wireless transceiver", but "phone" for easier understanding) has a display 20 which exhibits visible light. A portion thereof can be dedicated to a virtual keyboard 22 and/or left 24, middle, 26, and right 28 outputs from respective left 44, middle (front side) 46, and right 48 cameras on the phone. The phone, in turn, has a left side 34, middle or front side 36, and right side 38. A "virtual keyboard" is an image of letters or other indicia which are operating by touching a part of the display showing same.

A full view of the display 20 can be obtained from a bottom side of the device (e.g. when looking from a position closest to the bottom most edge of the device, where the bottom side/edge is where the I/O port is shown connecting to the cable 4 at connector 2). On this side, closest to the bottom, is where one may grip the phone such that the cameras are unobstructed by the grip. On the left side 34 of the phone 10 is a first camera 44 whose output (or a version thereof) is at a left ⅓, of the display 20, numbered 24. On the front side 36 of the phone 10 is a second camera 46 whose output (or a version thereof) is shown in the middle ⅓ of the display 20, numbered 26. On the right side 38 of the phone 10 is a right camera 38 whose output (or a version thereof) is shown on a right ⅓ of the display 20, which is numbered 28.

Figure 3:
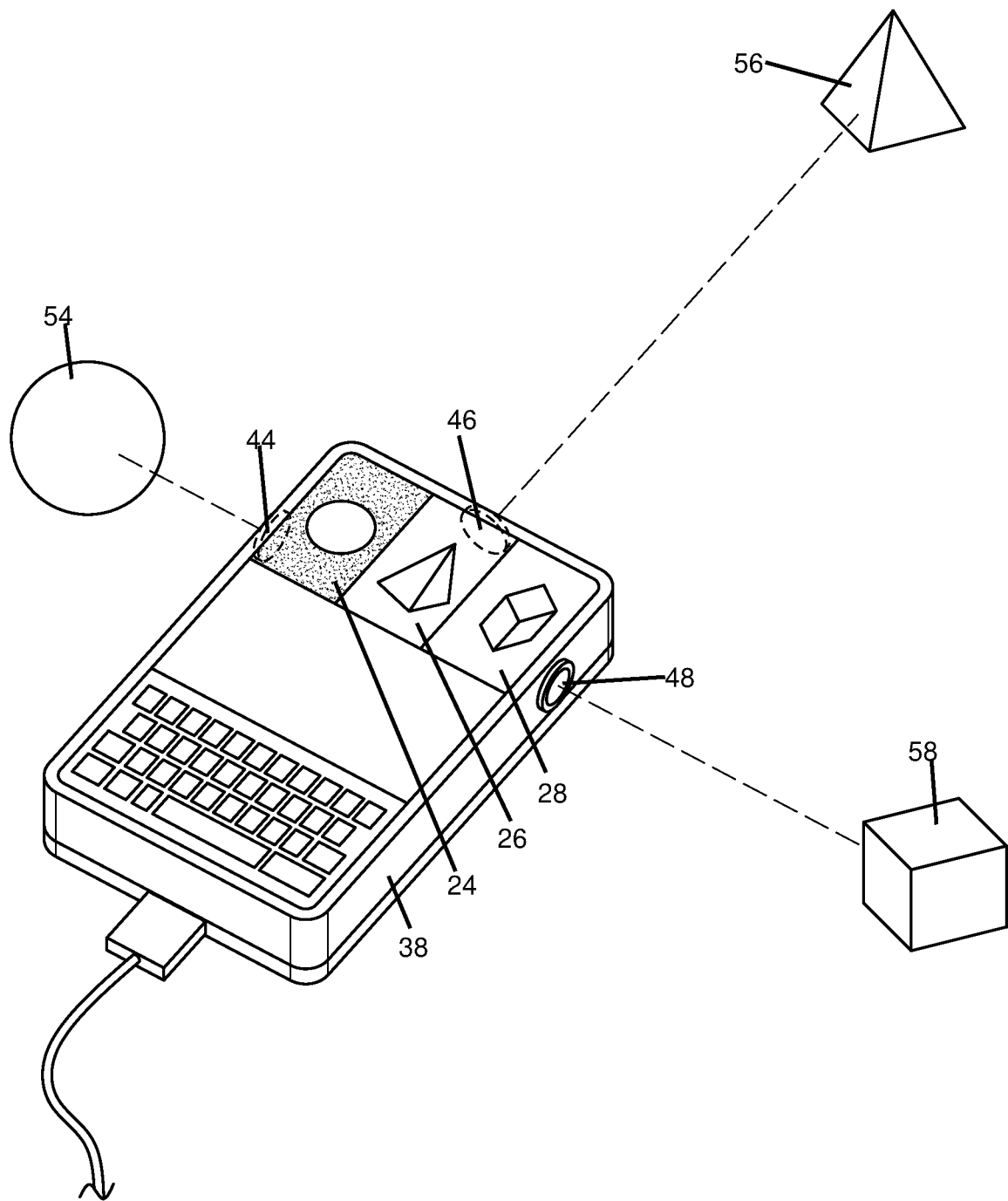
FIG. 3 shows the handheld wireless transceiver with output from each of three cameras.

FIG. 3 shows the handheld wireless transceiver with output from each of three cameras. Here, by way of example only, there is an external object 54 or sphere 54 to the left of the device. The directional indicators used in this disclosure are relative to a direction of typical use by someone operating the phone 10 where "bottom" is closest to the user, "top" furthest, and "left" and "right" being respective sides there-between. An image thereof the sphere 54 is received by the left camera 44 and displayed on the left ⅓ of the display 20, at numbered region 24. Likewise, a middle or top camera 46 receives an image of a pyramid 56 which is shown in the center ⅓ of the display at numbered region 26. Further, a right camera 48 receives in image of a cube 58 which is displayed within a right ⅓ of the display 20 at numbered region 28. In this manner, each ⅓ section of the screen has output from a different camera in embodiments of the disclosed technology. Two cameras may be used in other embodiments, such as just a left and right camera, a top/left camera and a top/right camera, and so forth. The camera views can then be merged together in a larger view such as a panoramic view or the like.

In any of the above cases, when an object is determined to be moving closer to the device 10 or respective camera seeing the object, then an alarm condition can be triggered or the display changed. This happens when, for example, the sphere 54 is within a pre-defined distance of the phone 10 (such as within 1 meter or 3 feet) and/or is moving closer to phone over time and remains in view of the camera. Such object tracking is known in the art by way of using infrared light and determining a response time thereof for each point in space where such light was transmitted. Additional infrared cameras may be necessary in such an embodiment. Object tracking using visible light and recognition of points in a frame and movement thereof is used in these or other embodiments of the disclosed technology, as known in the art.

As shown in FIG. 3, in this case the sphere 54 is within a collision alarm distance and/or is moving towards the device while staying in frame (either because the forward movement of the device is matching that of the object, or the device 10 is stationary while the sphere 54 moves closer; it is also possible that a user of the device 10 is holding the device sideways and moving forward or is shuffling to a side). The portion of the display 20 which corresponds to output from the camera 44 on the left side (numbered 24) is modified to warn the user of the device. This modification shown is a change in background color, a change in tint of the screen, or another visual change which alerts a user of the device. This can also include blinking the afore-described changes or blinking this portion of the display entirely or any combinations thereof.

Figure 4:
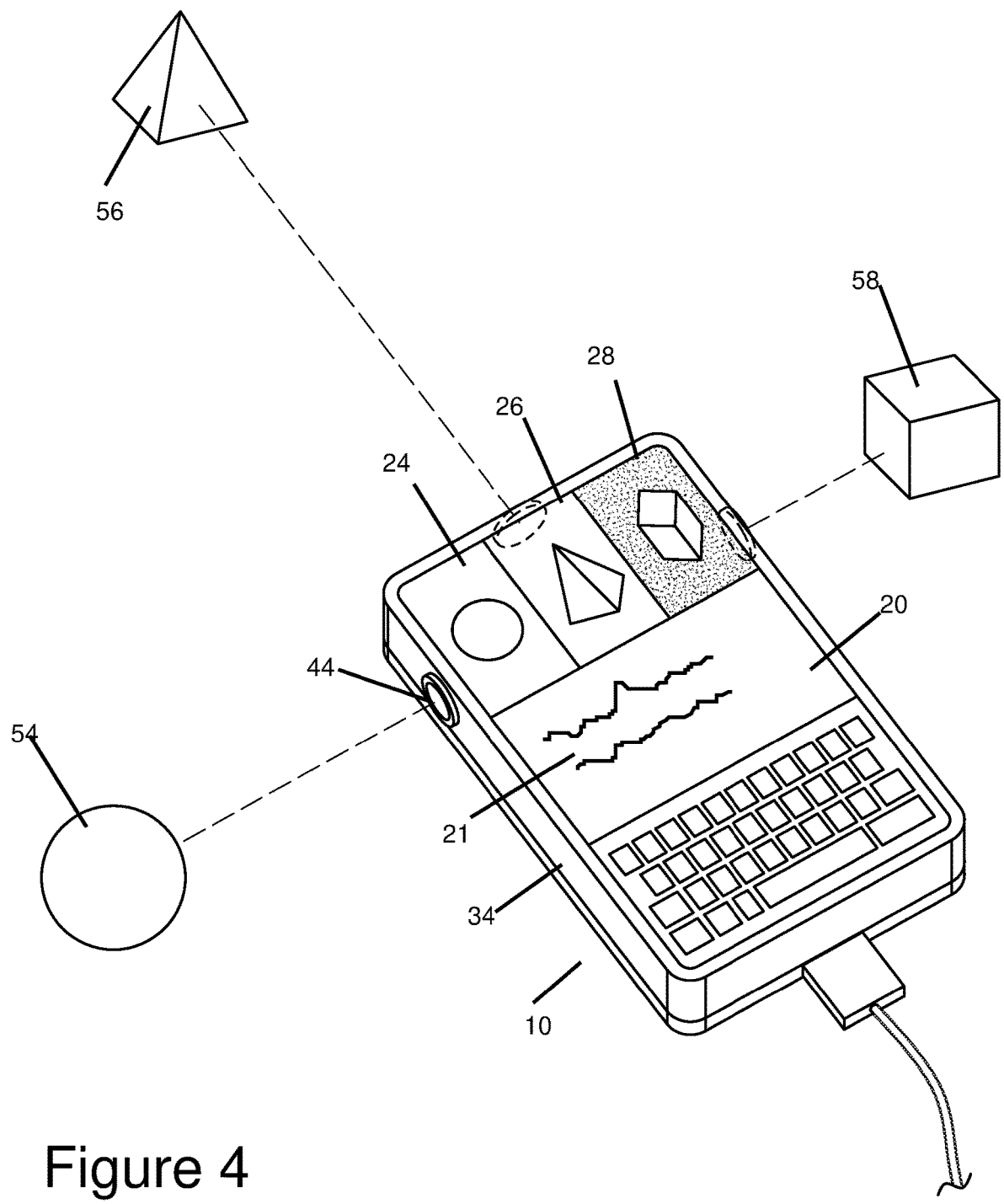
FIG. 4 shows the handheld wireless transceiver of FIG. 3 with texting and an alarm shown in reference to input from a right facing camera.
Figure 5:
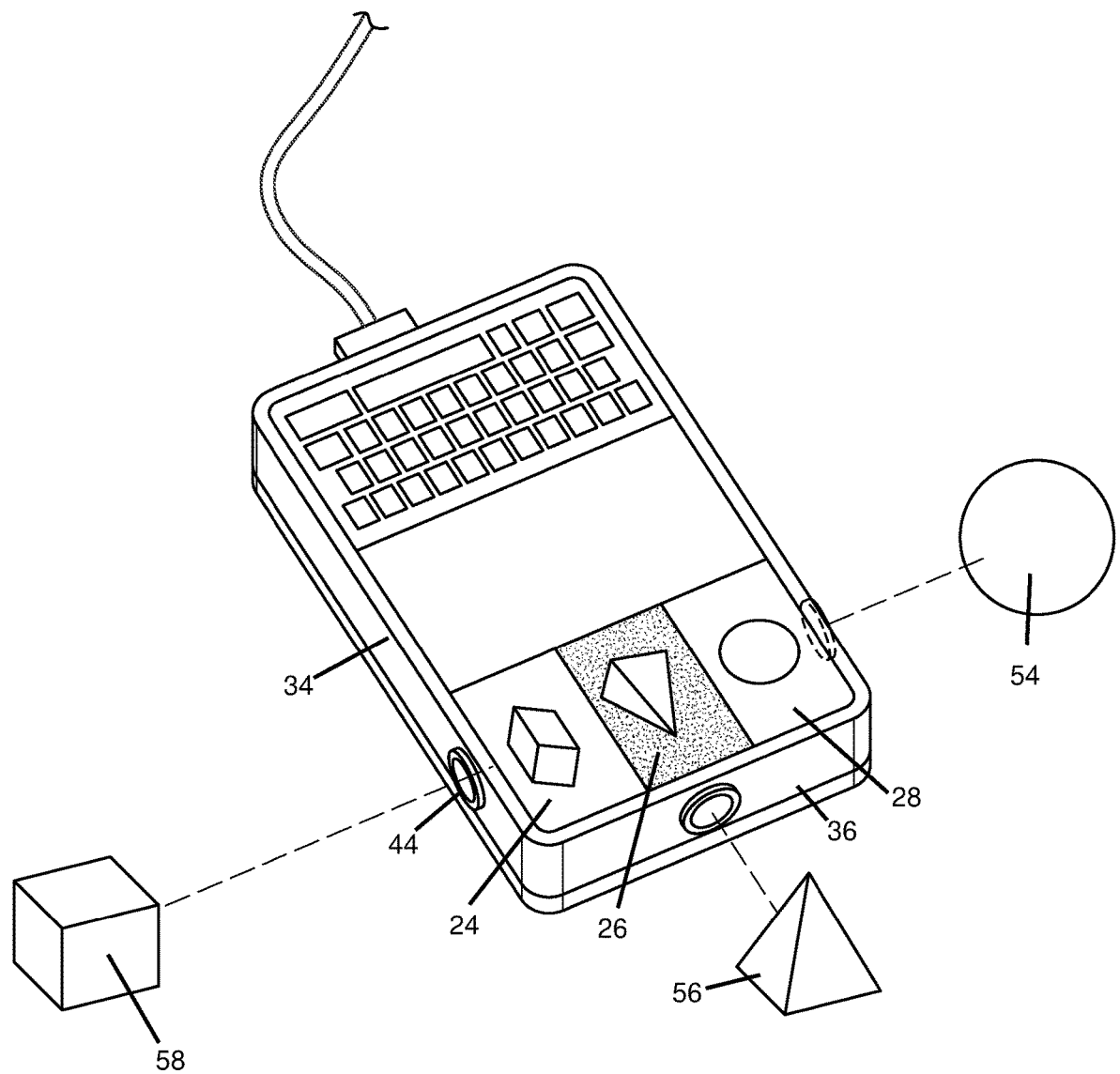
FIG. 5 shows the handheld wireless transceiver of FIG. 3 with an alarm shown in reference to input from a front facing camera.

FIG. 4 shows the handheld wireless transceiver of FIG. 3 with texting and an alarm shown in reference to input from a right facing camera. FIG. 5 shows the handheld wireless transceiver of FIG. 3 with an alarm shown in reference to input from a front facing camera. In these figures, what has been described above with reference to FIG. 4 is carried out respectively for a pyramid 56 and top camera 46, and cube 58 and right camera 48. The front or top camera 48 can be used by itself with output covering part of the display 10 in order to work only with avoiding collisions with objects in front of the device. This is useful when walking forward and avoiding walking into objects. Again, the shapes shown are examples of external objects and their relative distance to the phone 10. Detection of any object is within the scope of the disclosed technology.

Referring back to FIG. 3, on a part of the display 20 is a screen showing text messaging 21. "Text messaging" and "texting" has a definition in the Summary. When he text messaging feature is active on the phone, such as when a particular set of coded instructions is executed on the device allowing input of a text message or display of a received text message which is sent and/or received via wireless transmission, then in some embodiments a camera or cameras 44, 36, and/or 48 are activated. The display 20 then displays output or a version of output from the cameras on the display at locations 24, 26, and 28. Thus, when an interface for sending and/or receiving text messaging is shown on the display 20 (such as at 21) this is shown with, or as a result thereof, the display of camera output (26, 26, and/or 28) is also shown.

Figure 6:
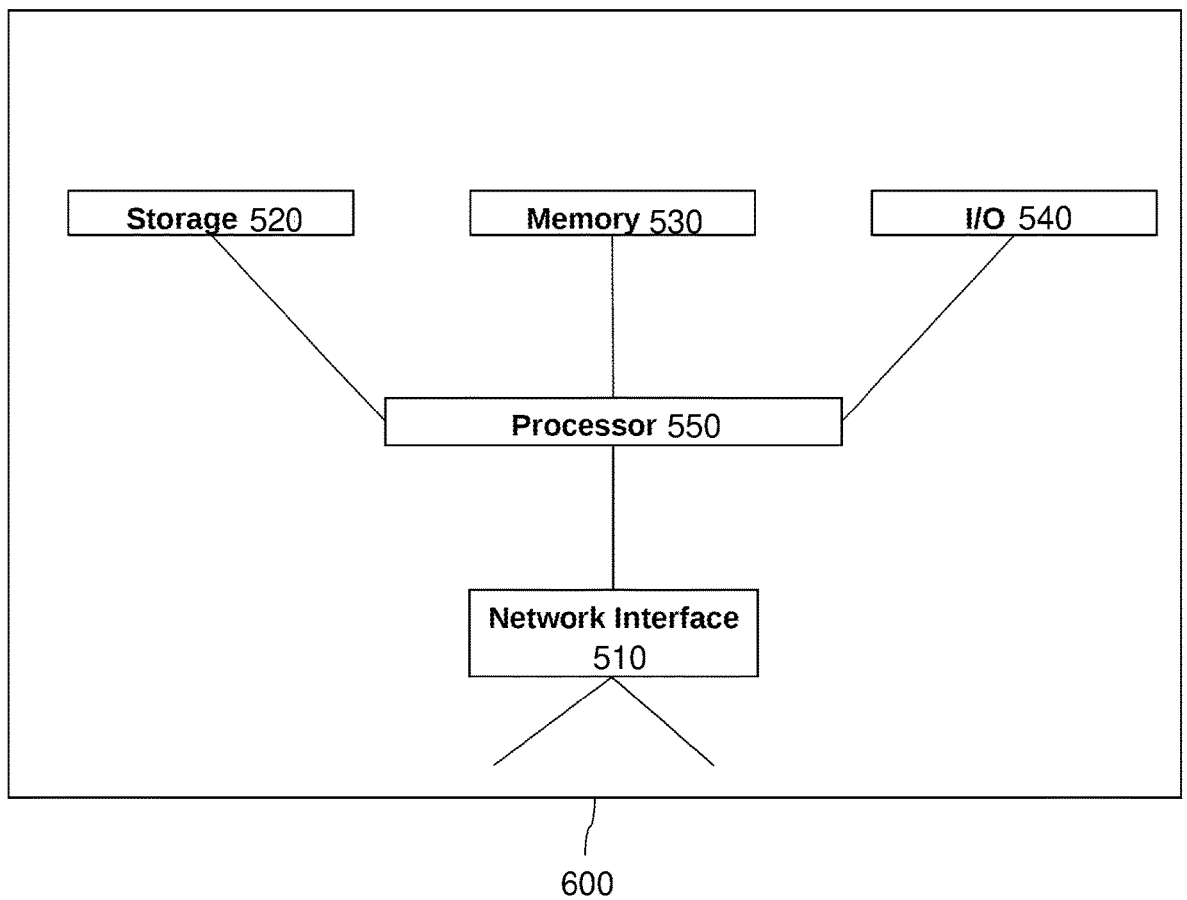
FIG. 6 shows a high level block diagram of devices used to carry out embodiments of the disclosed technology.

FIG. 6 shows a high level diagram of devices which are used to carry out embodiments of the disclosed technology. Device 400 comprises a processor 450 that controls the overall operation of the computer by executing the device's program instructions which define such operation. The device's program instructions may be stored in a storage device 420 (e.g., magnetic disk, database) and loaded into memory 430 when execution of the console's program instructions is desired. Thus, the device's operation will be defined by the device's program instructions stored in memory 430 and/or storage 420, and the console will be controlled by processor 450 executing the console's program instructions. A device 400 also includes one or a plurality of input network interfaces for communicating with other devices via a network (e.g., the internet). The device 400 further includes an electrical input interface. A device 400 also includes one or more output network interfaces 410 for communicating with other devices. Device 400 also includes input/output 440 representing devices which allow for user interaction with a computer (e.g., display, keyboard, mouse, speakers, buttons, etc.). One skilled in the art will recognize that an implementation of an actual device will contain other components as well, and that FIG. 4 is a high level representation of some of the components of such a device for illustrative purposes. It should also be understood by one skilled in the art that the method and devices depicted in FIGS. 1 through 5 may be implemented on a device such as is shown in FIG. 6.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

I claim:

1. A handheld transceiver with display and multiple cameras, comprising:
a body with a back side, front side, left side, right side, bottom side, and top side;
a display on said front side of said body;
at least two cameras, each on a different one of said front, left, and right sides, each of said at least two cameras oriented substantially at 90 or 180 degrees from each other camera,
wherein each of said at least two cameras is associated with a portion of said display, such that a version of output from each of said at least two cameras is simultaneously displayed in each corresponding portion of said display;
wherein a text messaging function of said handheld transceiver is only functional when said version of said output from said at least two cameras is exhibited in each said corresponding portion of on said display.

2. The handheld transceiver of claim 1, wherein said at least two cameras comprise a camera on said top side, a camera on said left side, and a camera on said right side of said body.

3. The handheld transceiver of claim 1, wherein said at least two cameras comprise a camera on said left side and a camera on said right side facing substantially opposite directions from one another.

4. The handheld transceiver of claim 1, wherein each of said at least two cameras is closer to said top side than to said bottom side and face away from said body.

5. The handheld transceiver of claim 2, wherein said top side is perpendicular to each of said front side, left side, and right side; and
said front side is perpendicular to said left side and said right side.

6. The handheld transceiver of claim 2, wherein each of a portion of a left, center, and right of said display exhibit a version of output from corresponding to a different one of said left, said front, and said right cameras.

7. The handheld transceiver of claim 1, wherein, based on detection of distance of an object to one of said at least two cameras, a version of said output in a portion of said display corresponding to said one of said at least two cameras, is modified.

8. The handheld transceiver of claim 7, wherein said modified version of said output in said portion of said display is modified by a change in color and/or brightness corresponding to a magnitude of said distance of said object to said handheld transceiver.

9. The handheld transceiver of claim 1, wherein each of said at least two cameras is activated when it is detected that a person is interacting with said display.

10. A handheld transceiver with display and multiple cameras, comprising:
a body with a back side, front side, left side, right side, bottom side, and top side;
a display on said front side of said body;
at least two cameras, each on a different one of said front, left, and right sides, each of said at least two cameras oriented substantially at 90 or 180 degrees from each other camera,
wherein each of said at least two cameras is associated with a portion of said display, such that a version of output from each of said at least two cameras is simultaneously displayed in each corresponding portion of said display; wherein each of said at least two cameras is activated when it is detected that a person is activating a text messaging feature of said handheld transceiver.

11. A wireless handheld transceiver comprising:
left, front, and right sides, at least two of which include an embedded camera;
a display facing in a direction which is transverse to each embedded camera; and
wherein a first portion of said display exhibits a first version of output from a first of said embedded cameras and a second portion of said display exhibits a second version of output from a second of said embedded cameras, and
wherein operation of an ability of said wireless handheld transceiver to conduct texting is contingent upon said first version of output and said second version of output being exhibited on said display.

12. The handheld transceiver of claim 11, wherein at least one of said first version of output and said second version of output is modified based on a determined distance of a nearest object to a respective one of said first and second embedded cameras.

* * * * *